US000001060H

United States Statutory Invention Registration [19]

[11] Reg. Number: H1060

Lazich

[43] Published: May 5, 1992

[54] MICROSTRUCTURE CORRELATION COUNTER

[75] Inventor: Michael Lazich, Ridgecrest, Calif.

[73] Assignee: The United States of America as represented by the Secretary of the Navy, Washington, D.C.

[21] Appl. No.: 547,280

[22] Filed: Jul. 2, 1990

[51] Int. Cl.[5] ..... G06K 9/00

[52] U.S. Cl. ..... 382/6; 377/10; 382/31

[58] Field of Search ..... 377/10; 350/162.12, 350/162.13, 162.14; 382/31, 6

[56] References Cited

U.S. PATENT DOCUMENTS

| | | | |
|---|---|---|---|
| 3,493,772 | 2/1970 | Daughters, II et al. | 250/222 |
| 3,689,772 | 9/1972 | George et al. | 250/211 J |
| 3,947,123 | 3/1976 | Carlson et al. | 356/39 |
| 4,213,036 | 7/1980 | Koop et al. | 235/92 PC |
| 4,362,386 | 12/1982 | Matsushita et al. | 356/39 |
| 4,475,236 | 10/1984 | Hoffman | 382/6 |
| 4,702,595 | 10/1987 | Mutschler et al. | 356/39 |
| 4,838,644 | 6/1989 | Ochoa et al. | 350/162.13 |
| 4,949,389 | 8/1990 | Allebach et al. | 382/31 |

OTHER PUBLICATIONS

Fujii et al., "Rotational Filtering for Randomly Oriented Pattern Recognition, " *Optics Communications,* vol. 36, No. 4, Feb. 15, 1981, pp. 255–257.

Fujii et al., "Rotational Matched Spatial Filter for Biological Pattern Recognition," *Applied Optics,* vol. 19, No. 7, Apr. 1, 1980, pp. 1190–1195.

Partin et al., "Spectral Analysis of Microscopic Phase Objects for Matched Filter Optimization," SPIE vol. 185, *Optical Processing Syst.,* 1979, pp. 159–162.

Almeida et al., "Pattern Recognition of Biological Specimens Via Matched Spatial Filtering," *J. of Appl. Photographic Eng.,* vol. 4, No. 1, Winter 78, pp. 28–30.

*Primary Examiner*—Bernarr E. Gregory

*Attorney, Agent, or Firm*—Sol Sheinbein; Melvin J. Sliwka; Harvey A. Gilbert

[57] ABSTRACT

An apparatus for analyzing unknown microstructures in samples with known microstructure configurations, both biological and non-biological, by optically correlating the unknown with the known. The apparatus employs a microscope to produce images of unknown microstructures in a sample, a laser for illuminating the sample, a Vander Lugt correlator, including a preselected matched filter for particular known microstructures of interest, for optically correlating the image of the unknown microstructures with preexisting images of known microstructures, a CCD array to detect correlation indicia, and a microcomputer to control positioning of the sample for imaging, orienting the matched filter, and scanning by the CCD array of the indicia resulting from the correlation for reading and counting the same.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

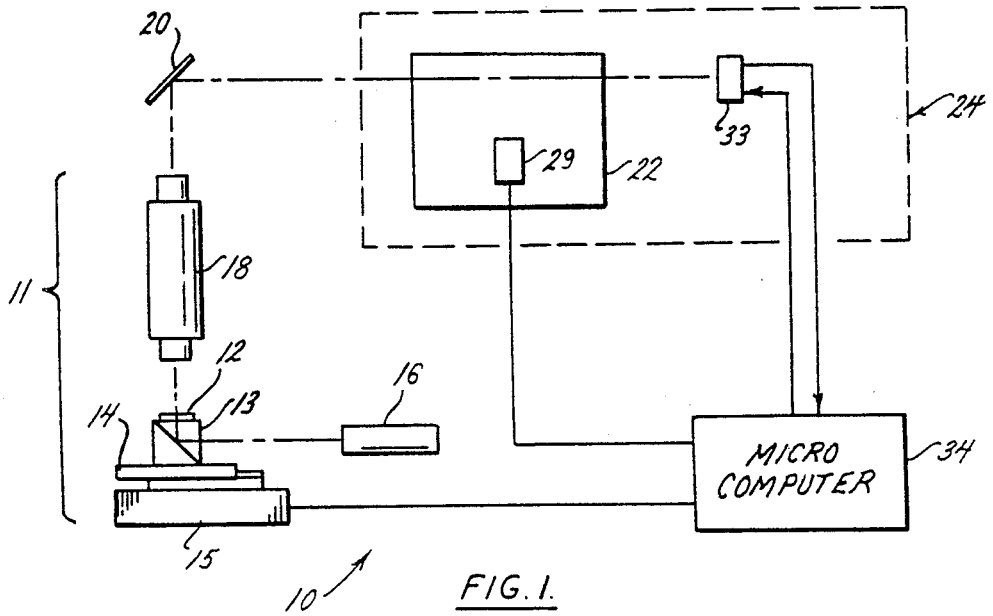
FIG. 1.
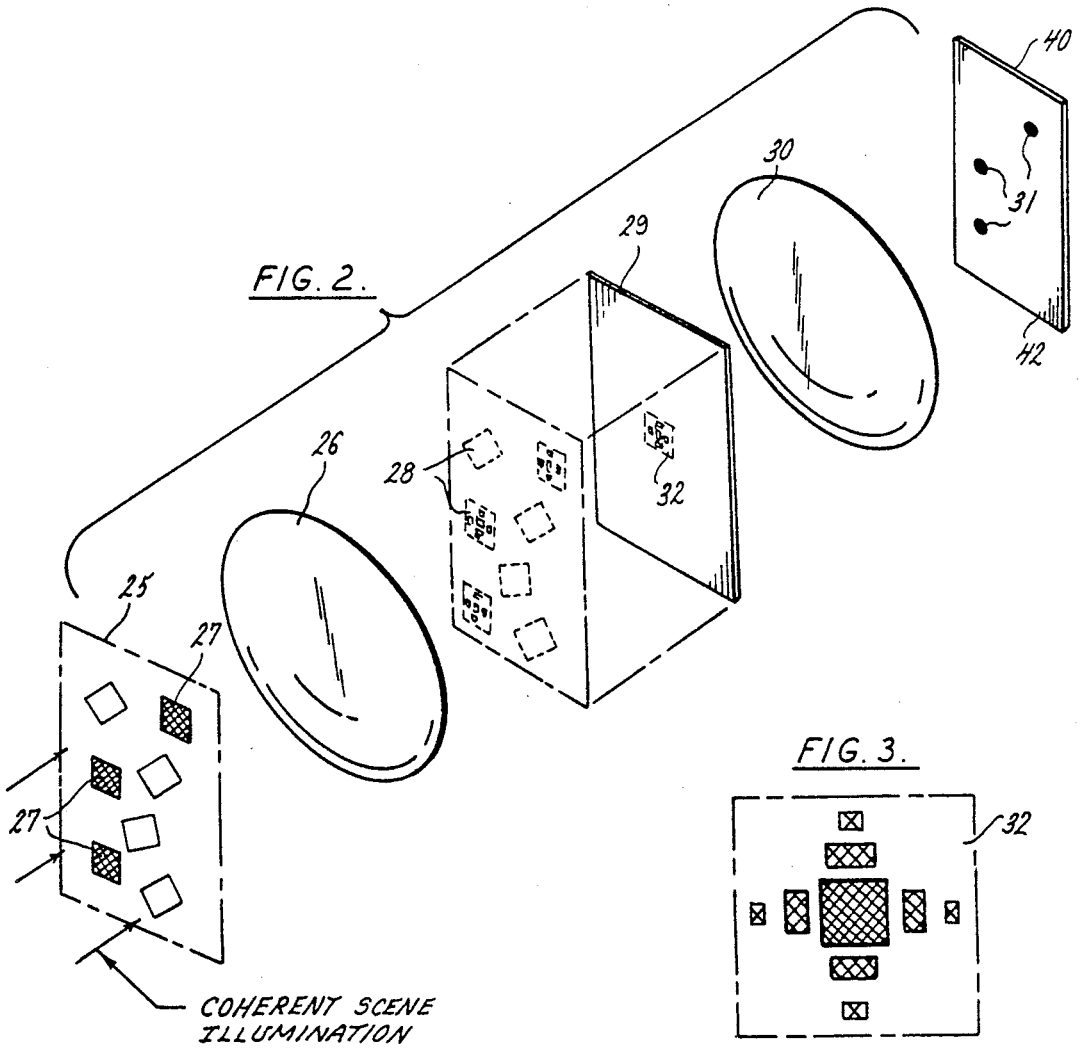
FIG. 2.
FIG. 3.

MICROSTRUCTURE CORRELATION COUNTER

BACKGROUND OF THE INVENTION

The present invention is an optical correlation counter, and more particularly is a cell correlation counter. The specific invention described herein can be computer controlled.

There is a continuing need for counting of very small particles in a variety of environments. Specifically, in cell research there are many areas which would benefit from more efficient counting techniques. Examples include cancer research, blood cell counting, sperm counting, AIDS research, fertility studies, and other areas of counting biological structures, microstructures, and particles, as well as non-biological particles and microstructures.

In older methods of cell counting performed in a laboratory environment, a human counter was required to be located at a microscope for extended periods of time to effectively, reliably and manually examine a sample. Even under the best of conditions in the laboratory environment, the requirement for carefully counting individual items of interest such as sperm cells and blood cells was, and is, very tiring and laborious. The process is time-consuming and subject to inconsistencies and variables such as operator experience and fatigue.

In addition to the fully manual cell or particle counting systems requiring varying degrees of human interaction, there have been a variety of systems in the prior art that have introduced some degree of computer control to permit mechanization, or at least partial mechanization, of the counting activity. Thus, U.S. Pat. No. 702,595 to Mutschler et al, describes a pattern recognition system with working area detection which automatically positions a field being examined for cell or particle counting in a proper position with respect to an optical scanning means. This system is directed to optimization of pattern recognition and to automatically enable examination of the field of the observation within a good working area. The system is particularly applicable to examination of blood smears on a slide, by positioning the slide to enable examination without operator intervention.

Also, in U.S. Pat. No. 4,475,236 to Hoffman, a method is disclosed for rapidly analyzing a mixture of unknown stained cells and known cells having different staining characteristics, a cell at a time, in a flow cytometry system having a sample stream dimension in the range of the expected cell dimensions. The cells are illuminated and fluorescence is detected and related to the number of cells being observed. A histogram of the mixture sample may be analyzed by counting the cells in a controlled population below a relatively low threshold value of fluorescence intensity.

In U.S. Pat. No. 4,362,386 to Matsushita et al, a method is disclosed for mechanization of a microscope stage to move the field of view of a slide having a blood smear thereon to an optimum position within the smear, under computer control, so that white blood corpuscles can be detected, counted, and automatically classified within the optimum area of the slide.

Finally, in U.S. Pat. No. 4,213,036 to Kopp et al, a method of probing a biological cell sample with an optical source to determine the characteristics of the cell image by way of measuring parameters from its two-dimensional Fourier transform is disclosed. This patent discloses a method of measuring discriminating parameters for cell classification by use of the Fourier transform technique.

The aforementioned techniques of the prior art employ varying degrees of manual, semi-automated, and fully automated techniques for small biological particle examinations, classifications, and counting. None, however, employ the techniques and methods of the present invention.

SUMMARY OF THE INVENTION

It is thus an object of the present invention to provide a means and methodology for counting recognized biological and non-biological microstructures.

It is yet another object of the present invention to provide a fast, reliable, and repeatable means and methodology for counting recognized microstructures.

It is still another object of the present invention to provide a semi-automated means and methodology for counting recognized microstructures.

In accordance with the present invention, a specimen sample containing microstructures, such as cells in human blood, is placed on the stage of a microscope moveable in two-dimensions relative to the imaging assembly of the microscope. The specimen is illuminated by a collimated light source such as a laser, and the image upon leaving the imaging portion of the microscope is communicated to an optical correlator, which consists of a Vander Lugt correlator which includes a matched-filter spatial light modulator for the particular type of specimen being sought in the image being transmitted from the microscope. The matched-fiber is located within the Fourier plane of the first lens of the correlator. A charge coupled detector (CCD) array of a CCD camera is located in the image plane behind a cross-correlation lens within the correlator to receive correlation peaks, the indicia of correlation, resulting from a match between the Fourier transform image of the image communicated from the specimen being observed by the microscope and the image constituting matched filter. The present invention, in its preferred embodiment, includes a microcomputer to position the specimen sample on the two-dimensionally moveable microscope stage for examination of various fields of regard (FOR) preselected for the particular specimen being examined within the microscope field of view. The microcomputer also controls the spatial light modulator, which is the matched filter within the optical path of the Vander Lugt correlator, in order to position the filter in various spatial alignments relative to the specimen image being transmitted by way of the microscope through the correlator, so that all matching microstructure configurations and spatial orientations can be accommodated by the invention. The invention does require that matched filters be prepared ahead of time and stored, if in electronic form, within the primary or peripheral memory of the microcomputer, or as positive or negative transparency images, so that they may be employed as spatial light modulators for use within the correlator of the system. Finally, the microcomputer is used to programmably control the scanning of the correlator image plane by means of the CCD array employed by the invention for detecting and counting of the indicia of correlation, the correlation peaks appearing thereon. The apparatus and methodology of the present invention thus make it possible not only to identify and thus recognize a particular microstructure whether it be biological or non-biological, but also to permit the counting of such microstructures. The use of the optical Fourier transform techniques in the present invention make possible high speed and accurate recognition and counting considerably faster than the prior art technologies.

BRIEF DESCRIPTION OF THE DRAWINGS

The above recited objects and summary of the present invention will be more readily understood by reference to the following detailed description when considered in conjunction with the accompanying drawings wherein:

FIG. 1 is a schematic block diagram of the present invention.

FIG. 2 is a schematic perspective representation of the correlator of the present invention.

FIG. 3 is an enlarged representation of a Fourier transformed microstructure image constituting the matched filter.

DETAILED DESCRIPTION OF THE PREFERRED EMBODIMENT

With reference FIG. 1, the counter 10 of the present invention is shown in conjunction with the specimen sample 12 in the optical path of the microscope 11. The counter 10 is comprised of the microscope 11 having the moveable stage 14 which is shown located upon the microscope base 15 in line with the microscope imaging assembly 18. The sample 12 rests upon the reflector 13, a right angle prism, which is shown in position upon the two-dimensionally-moveable X-Y stage 14 upon the microscope base 15. The laser 16 illuminates the specimen sample 12 by providing coherent light via the reflector 13. The light communicated to reflector 13 is transmitted at an angle of 90 degrees upward through the specimen sample 12 and into the microscope imaging assembly 18. The image of the illuminated sample 12 and the microstructures therein is communicated from the microscope 11 by way of the corner reflector 20 to means 24 for analyzing the unknown microstructures in the sample with known microstructure configurations in accordance with the present invention. The correlator 24 consists of the Vander Lugt correlator 22 which contains the matched filter spatial light modulator 29 in the correlator optical path for the purpose of introducing a known and pre-stored microstructure Fourier transform image to the correlator 22 for correlation with the Fourier transform image of the coherently illuminated and microstructure containing specimen sample 12 received from the microscope 11. The CCD camera 33 is also located in the analyzing means 24 in optical alignment with the cross correlation lens 30, seen in FIG. 2, that is included within the Vander Lugt correlator 22. The spatial light modulator 29 is connected electrically to the microcomputer 34 so that the computer can provide electronically imaged and stored matched filters 32 to the analyzing means 24 in the variety of orientations desired. Also, the CCD camera 33 within the analyzing means 24 is connected to the microcomputer 34 so that the results of the cross correlation function within the Vander Lugt correlator 22 can be detected, counted, and passed to the computer for count storage. The arrow going from the microcomputer 34 to the CCD camera 33 in the analyzing means 24 represents the communication of control signals to the camera to permit it to scan the entire cross correlation image through as many fields of regard (FOR) desired for the purposes of counting the indicia of the correlated microstructures, the correlation peaks within the original specimen image introduced to the correlator 22.

More specific details of the correlator 22 are shown in FIG. 2 where a spherical Fourier transform lens 26 is shown coaxially aligned a focal length away from the spatial light modulator 29 also coaxially aligned in front of the cross correlation lens 30. The cross correlation lens 30 is likewise located coaxially in front of the image plane 40 of the correlator 22 occupied by the charge-coupled device array 42 of the CCD camera 33, or other scanning detector, and a focal length distance away from that array.

OPERATION

In operation, the coherent illumination of the specimen sample 12 by the laser 16 produces a normal image of the first fields of regard (FOR) 25, FIGS. 1 and 2, being imaged by the microscope imaging assembly 18. The microstructure images 27 within the FOR 25 are shown in FIG. 2 prior to the Fourier transform lens 26. That FOR image 25 containing the microstructure images 27 is produced at the Fourier transform lens 26 which in turn produces fourier transformed images 28 at the spatial light modulator 29 in FIG. 2. The image 28 and the matched filter 32 in FIG. 2 are in actuality in the same plane. They are shown apart for discussion and understanding only. An enlarged view of a single transform microstructure image 28 which presents at the spatial light modulator 29 as the matched filter 32 is shown in FIG. 3.

Microcomputer 34 is programmed to position the moveable stage 14 of microscope 11 upon microscope base 15 through a sequence of two-dimensional X-Y, horizontal plane adjustments in order to present the pre-determined number of FOR of the specimen sample 12 for examination.

In the preferred embodiment of the present invention, the computer 34 digitally stores the Fourier transform images 28 of the microstructure images 27 of interest for use as match-filter spatial light modulators 29. These pre-stored and transformed microstructure images 28 which are the matched filters 32 are programmably rotatable by computer 34 through a number of planar orientations, relative to the FOR image 25, pre-determined to be necessary to attain the highest degree of correlation needed. In the alternative, a rotationally invariant filter may be employed for the matched filter spatial light modulator 29.

Thus for each field of regard (FOR) of the specimen sample 12 an image is presented in sequence to the analyzing means 24. For each such FOR image 25 the matched filter 32 is programmably sequenced by computer 34 through the pre-determined number of spatial orientations relative to the FOR image 25 to maximize or optimize the opportunities for correlation in relation to the particular type of microstructure being examined, e.g., cancer cell, AIDS virus, etc. The correlation function is performed repeatedly for each FOR of a specimen sample 12 until all FORs are exhausted. When a match of the Fourier transformed microstructure image 28 occurs at the match filter 32, the multiplied image thus produced is then communicated to the cross correlation lens 30, located a focal length in front of the image plane 40 of the correlator 22 where it is further Fourier transformed to an image at the image plane 40 in FIG. 2. The image at the image plane 40 constitutes indicia of correlation or correlation peaks 31 resulting from matching between the transformed microstructure images 28 and the matched filter 32 at the spatial light modulator 29. These indicia or peaks are readable and countable manually, semi-automatically or automatically. The CCD array 42 of the CCD camera 33, or equivalent image pixel scanning and capture devices and an electronic counter such as would typically be found in the microcomputer 34 may be used for semi-automatic and fully automatic counting.

It will be understood by those skilled in the art that the present invention may be configured in a variety of forms consistent with the details and operational description recited herein while remaining within the bounds of the claims which follow.

What I now claim as my invention is:

1. An apparatus for counting microstructures in a sample by optical correlation of an image of said microstructure with a pre-existing image of said microstructure producing indicia of said correlation, said apparatus comprising:

(a) a microscope for imaging said sample having an optical axis;

(b) a programmable stage being translatable in X-Y dimensions relative to said optical axis of said microscope and being capable of holding and positioning in said X-Y dimensions all or portions of said sample in the optical field of view of said microscope, said stage being operationally disposed in juxtaposition with said microscope;

(c) a laser aligned with said optical axis of said microscope and capable of coherently illuminating said sample and being operationally disposed in juxtaposition with said microscope to produce an image of the microstructure in said sample;

(d) a Vander Lugt correlator disposed coaxially with said optical axis of said microscope, said correlator having a spherical Fourier transform lens disposed to receive from said microscope the sample image produced by said laser, a matched filter spatial light modulator disposed coaxially a focal length behind said Fourier lens for providing a pre-existing image of a particular microstructure, a cross-correlation lens disposed coaxially behind said matched filter spatial light modulator, and an image plane disposed a focal length behind said cross-correlation lens, said correlator being operable for optically correlating said image of the microstructure in said sample with said pre-existing image and producing indicia of said correlation which is received at said image plane thereof;

(e) means disposed in optical juxtaposition with said correlator for detecting the indicia of correlation at said image plane; and (f) a computer operationally disposed for programmable X-Y dimension translating of said translatable stage holding said sample at said microscope, rotating said matched filter spatial light modulator of said correlator, programmable scanning said detecting means across said image plane, and counting the detected indicia of correlation received at said image plane.

2. The apparatus of claim 1 wherein said detecting means at said image plane contains a CCD array for detecting the indicia of said correlation.

3. The apparatus of claim 2, wherein said CCD array further comprises means for scanning said array pixel by pixel for counting the indicia of said correlation.

4. The apparatus of claim 2 wherein said image plane is scanned by said CCD array.

5. The apparatus of claim 1 wherein said matched filter spatial light modulator is programmably rotatable about the optical axis of said correlator with which said filter is coaxially disposed.

* * * * *